June 30, 1970     K. K. POCS     3,518,687
MICROWAVE ANTENNA SIDE LOBE AND BEAM REDUCTION APPARATUS
Filed Dec. 9, 1966     6 Sheets-Sheet 1
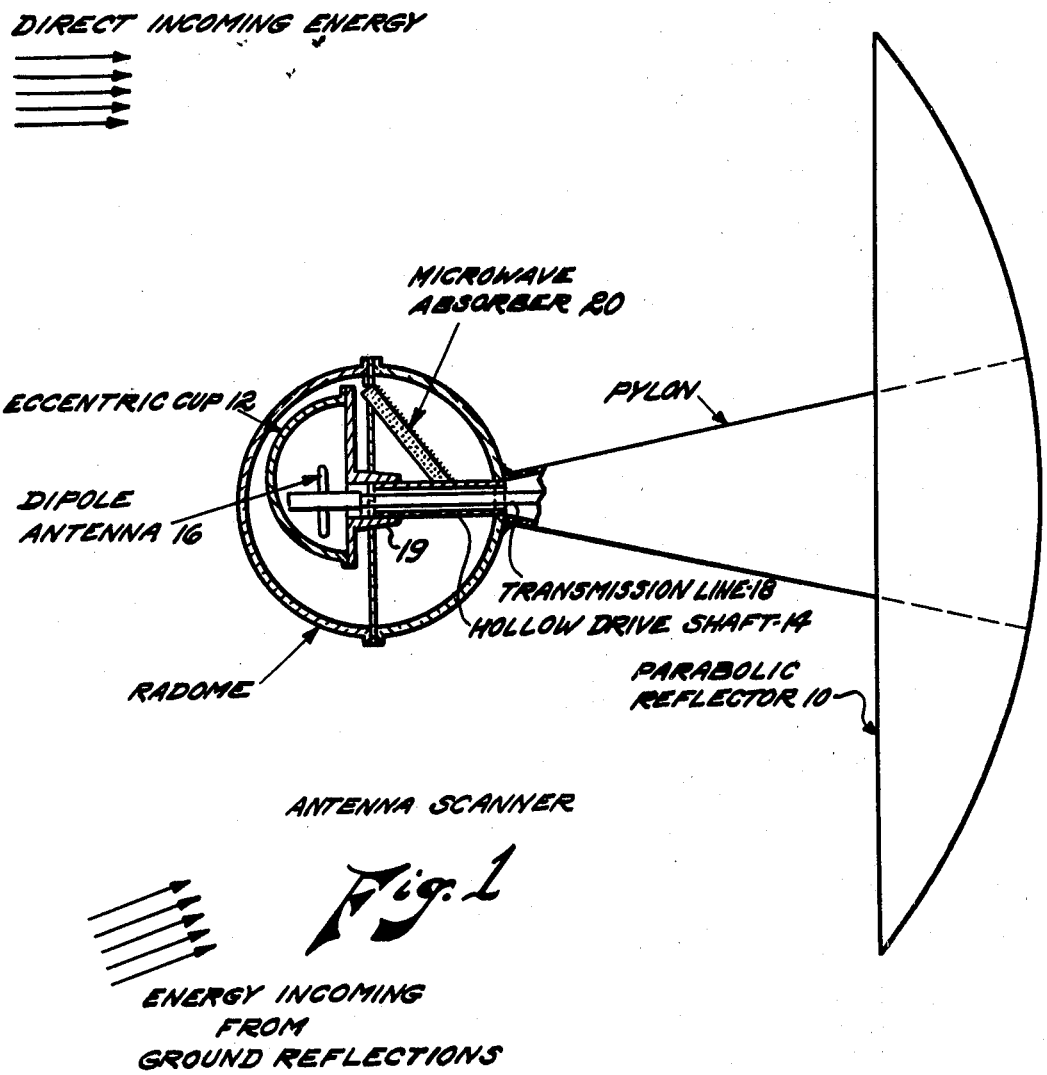
INVENTOR.
KONSTANTINS K. POCS

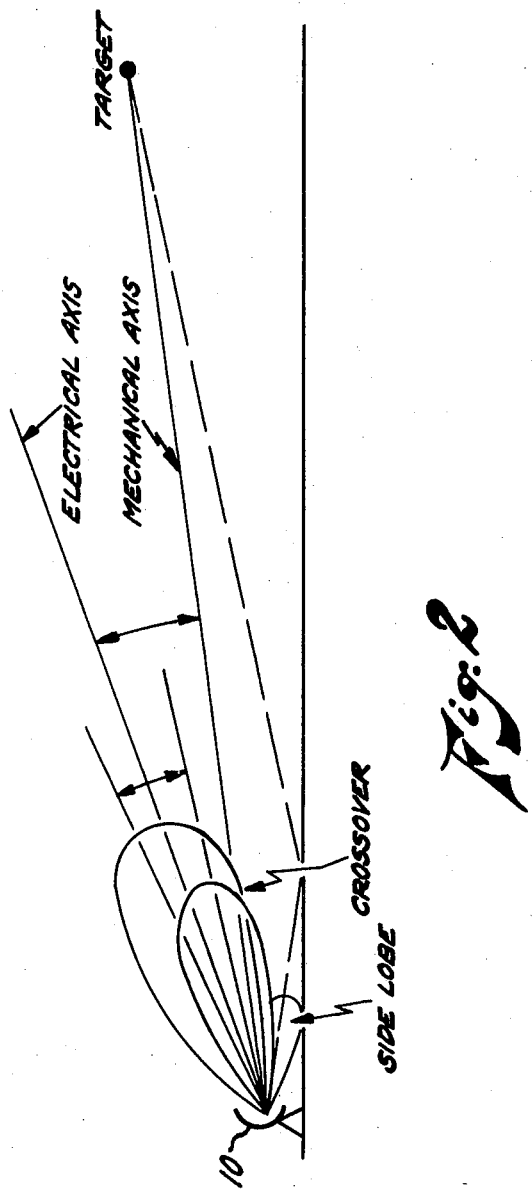

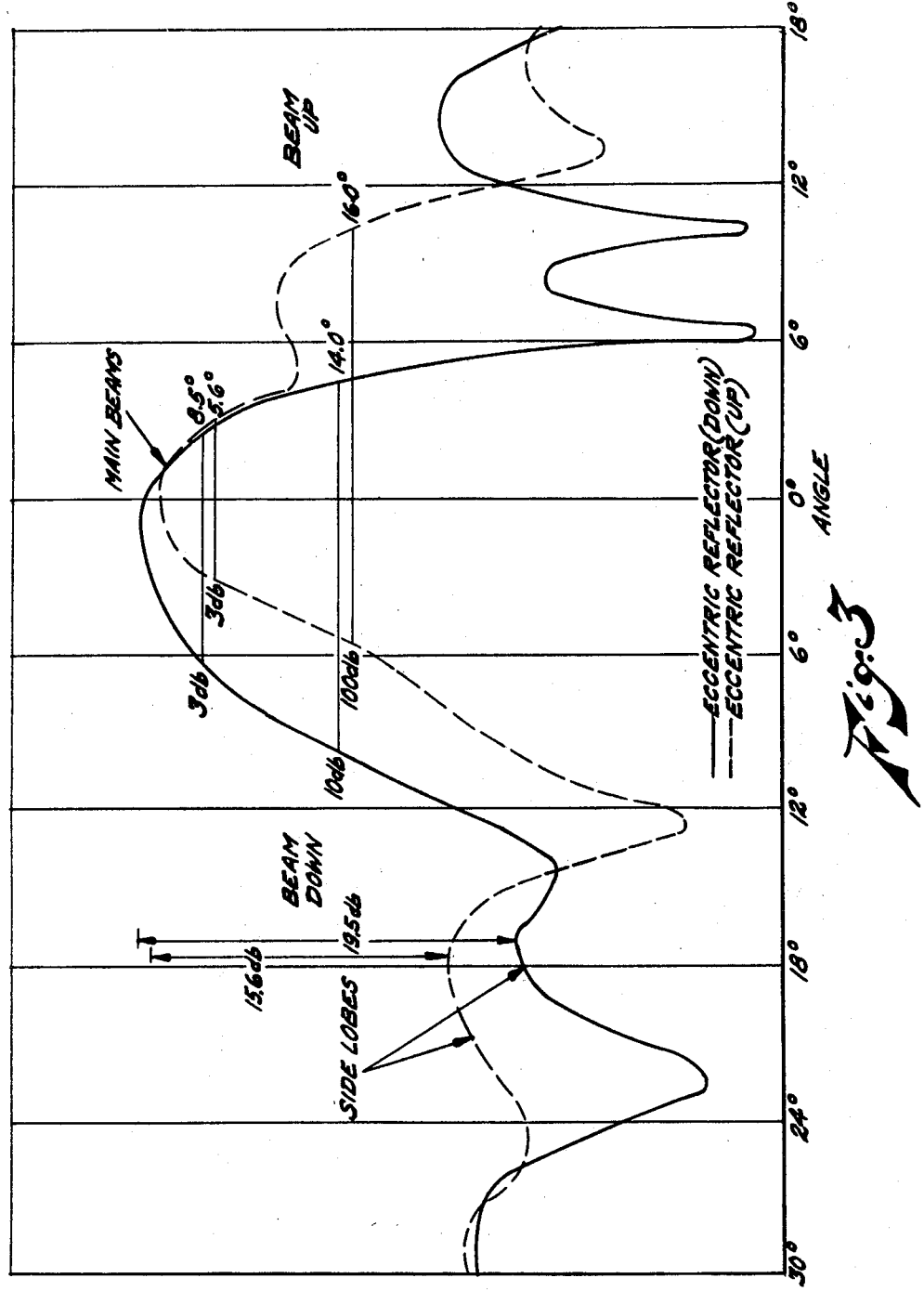

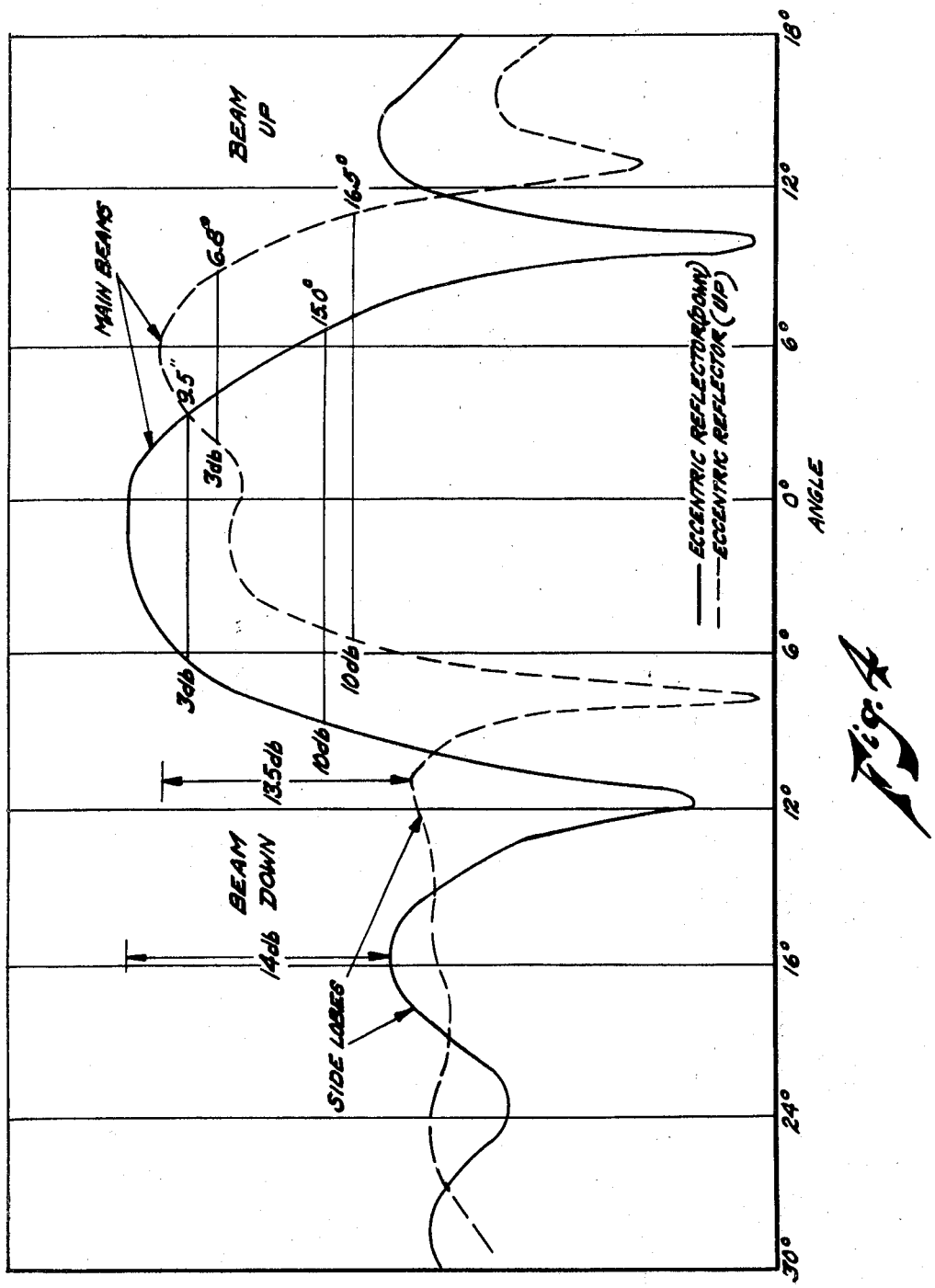

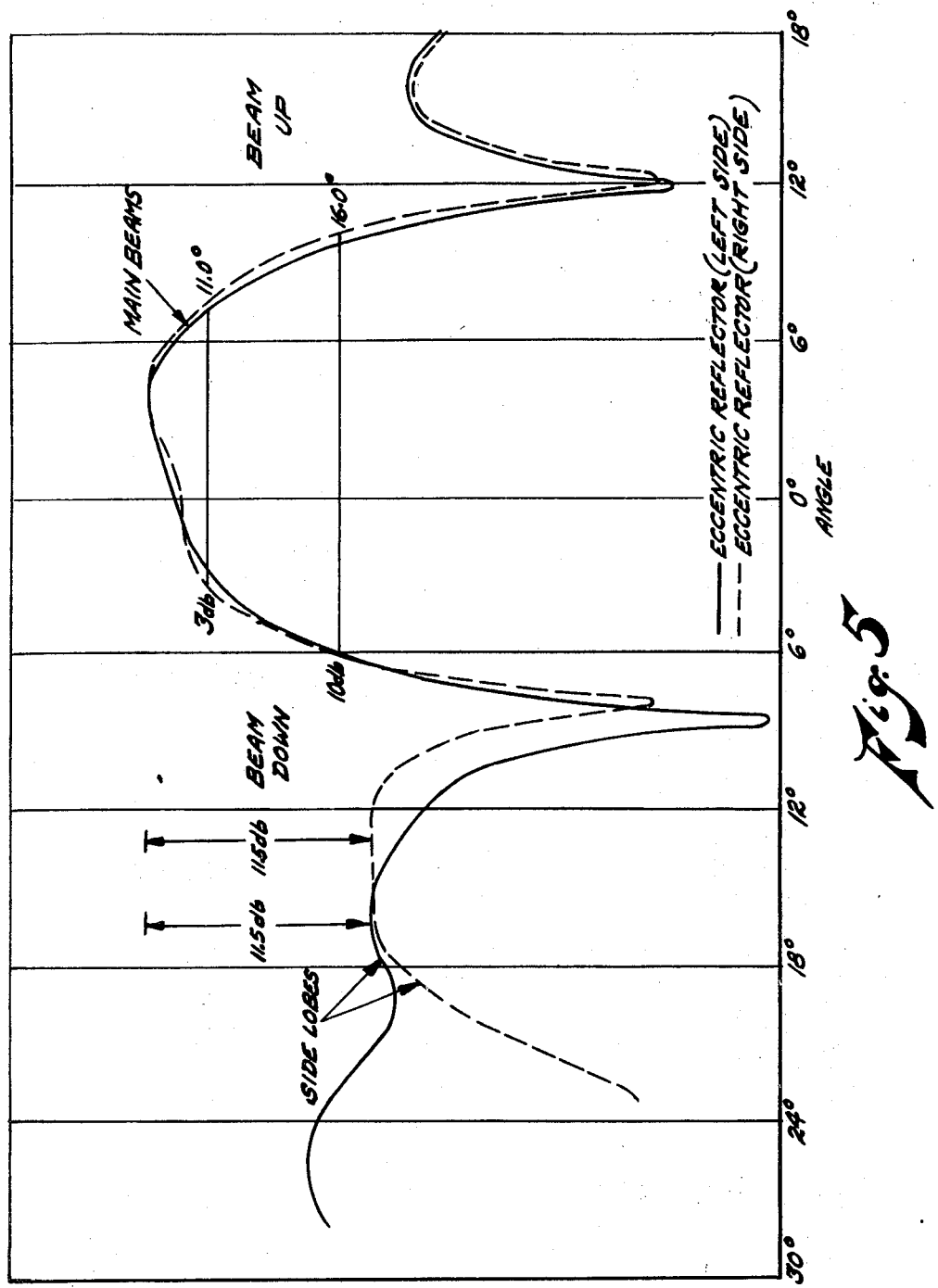

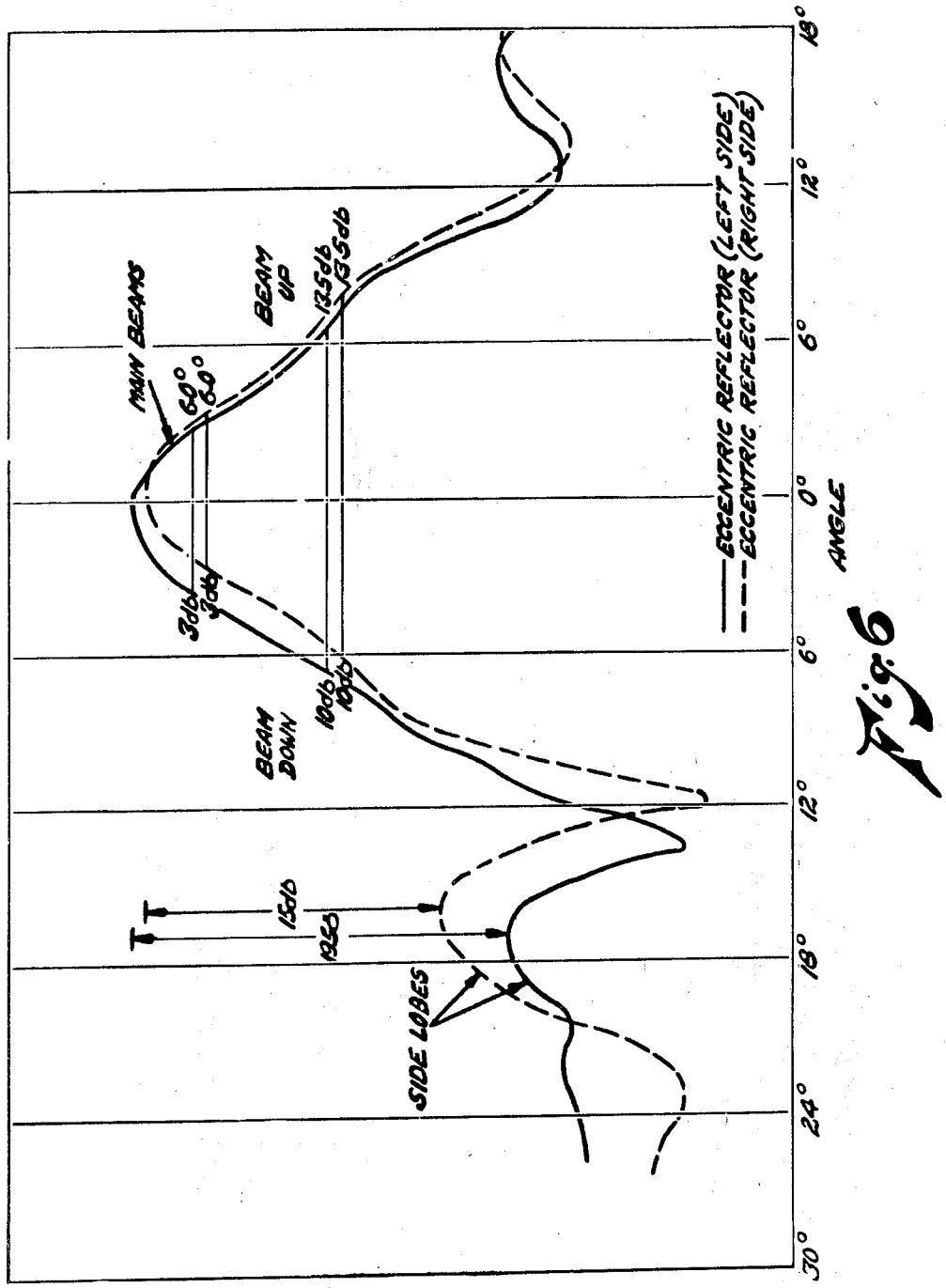

3,518,687
MICROWAVE ANTENNA SIDE LOBE AND
BEAM REDUCTION APPARATUS
Konstantins K. Pocs, North Chelmsford, Mass., assignor to the United States of America as represented by the Secretary of the Air Force
Filed Dec. 9, 1966, Ser. No. 600,672
Int. Cl. H01g 3/12, 19/12
U.S. Cl. 343—761                                    4 Claims

ABSTRACT OF THE DISCLOSURE

A microwave antenna side lobe and beam reduction apparatus having a tuned microwave absorbent material positioned between the rotable eccentric cup and the antenna reflector for absorbing proportionately more of the incoming R-F energy from a downward direction than from the upward direction.

---

This invention relates in general to radar ground tracking systems, and more particularly, to the antenna scanner sub-system.

The instant invention has utility in systems used for the ground tracking of balloon-borne radiosondes and rocketsondes, high performance aircraft, missiles and rockets. Due to the improved performance of rockets the ground tracking equipment must achieve and maintain a higher degree of accuracy than heretofore required. However, serious tracking errors are introduced in prior art ground antenna scanner sub-systems caused by an appreciable portion of the main beam being distorted by ground reflected waves at elevation angles below six degrees.

Data gathered from the tracking of radiosondes and rocketsondes are the principal source of information for weather maps and forecast resulting therefrom, for climatological studies and for design criteria for the large space rockets and ballistics missiles. However, prior art tracking devices do not permit accurate tracking of the sonde target when elevation angles are low and ground reflections occur. The low angle conditions usually exist when winds are strongest. Thus, more accurate tracking means better data when it is most urgently needed.

The characteristics of prior art antennas having a reflecting concentrator are well understood; however, they are subject to limitations which make the antenna design a compromise between sensitivity, angle, size, and cost. Improvement in sensitivity and angle performance of prior art devices generally requires an increase in size and cost of the reflector. Particularly, for an automatic tracking antenna, a narrowing of the beam and reduction of the side lobes is important. With a narrower beam a better signal is obtained for the amplifiers and tracking mechanism. Also with a narrower beam, tracking can be accomplished at angles nearer to the ground surface without exceeding a given limit of error, because the effects of reflection of the incoming radio signal from the surface are reduced. Side lobes can be a source of large error because automatic tracking equipment can track on a side lobe as well as on the main beam if it gets started on a side lobe. When an antenna is used to receive a signal coming from an angle near the ground surface, an appreciable part of the received signal is reflected from the ground and approaches the antenna from an angle different from that of the true source.

Accordingly, a primary object of this invention is to provide an improved ground antenna scanner system for reducing errors caused by the effects of ground reflection at low elevation angles.

Another object of this invention is to provide microwave absorber means in combination with an antenna scanner system for suppressing ground return at low elevation angles.

And still another object of this invention is to provide an improved ground antenna scanner system which reduces ambiguous tracking by providing lower height of sensitivity side lobes relative to the main radar beam return and narrower width of the main beam.

To the accomplishment of the foregoing objects, together with other features and advantages, the instant invention comprehends the utilization of microwave absorbent material used in a particular manner to alter the sensitivity (radiation beam) of a wide angle microwave antenna in a conical scan mode of operation. The ground antenna scanner assembly comprises a parabolic reflector, an eccentric cup which is rotated by a drive motor and hollow drive shaft, a dipole antenna, and a transmission line.

A tuned microwave absorbent material is placed between the spin cup and antenna reflector so as to absorb proportionately more of the radio-frequency energy coming from a downward direction than from the upward direction. In addition to the physical geometrical positioning of the microwave absorbent material to provide increase directivity (reduce side lobes), the distance of the absorber from the eccentric cup varies with frequency. Also, dimensions and shape of the absorbent material are important factors.

The invention will be more fully understood from a consideration of the following more detailed discussion of its principles and methods, and description of a preferred embodiment, taken in conjunction with the drawings, in which:

FIG. 1 is a schematic diagram illustrating use of the microwave scanner in an antenna scanner embodiment of the invention;

FIG. 2 is an explanatory diagram of the effects of ground reflection on radiation patterns produced by a conical scanning antenna; and FIGS. 3, 4, 5, and 6 are diagrams illustrating the lower height of sensitivity side lobes relative to the main beam and narrower width (3 db points) of the main beam.

Now referring to FIG. 1, shown is the antenna R-F system of a receiving-type, automatically tracking, radio direction finder set. The remainder of the automatic tracking system (not shown) comprises receiving, antenna positioning, and various utilization sub-systems. In one application the directional antenna of the radio direction finder set may be tracking a balloon-bore radiosonde transmitter. The angles of azimuth and elevation of the antenna and the height of the balloon determine the position of the balloon. Changes in the computed position of the balloon over a given time are indicative of the wind velocity and direction.

The R-F system shown in FIG. 1 comprises parabolic reflector 10, eccentric cup 12 rotated by a drive motor (not shown) and hollow drive shaft 14, dipole antenna 16, transmission line 18, and microwave absorber 20. Parabolic reflector 10 receives the R-F energy from the target radiosonde and concentrates it on eccentric cup 12, located just beyond the focal point of parabolic reflector 10. Eccentric cup 12 is an off-center, hemispherical reflector which collects the R-F energy reflected from parabolic reflector 10 and diverts it toward dipole 16. Eccentric cup 12 is driven by the antenna scanner assembly drive motor (not shown) and hollow drive shaft 14 and rotates in front of dipole 16. Rotation of eccentric cup 12 causes the antenna lobe to rotate about the electrical axis of parabolic reflector 10. Rotating joint 19 located at the dipole end of hollow drive shaft 14 acts as a quarter-wave choke to prevent antenna currents from flowing on the outside of drive shaft 14. The R-F energy reflected by eccentric cup 12 induces an R-F signal in half-wave dipole 16 which is then applied to transmission line 18. Right coaxial transmission line 18 conveys the R-F energy from dipole 16 to the mixer in the receiving system (not shown). Tuned microwave absorbent material 20 is placed between spin cup 12 and antenna reflector 10 so as to absorb proportionately more of the R-F energy coming from a downward direction than from the upward direction. The tuned microwave absorber 20 is also at a predetermined angular relationship with respect to the dipole antenna 16. The microwave absorber 20 is askew with respect to the dipole antenna 16. This particular angular relationship is quite important to the operation of the present invention, because the surface area of the absorber 20 which is presented to the energy incoming from ground reflections after they have been reflected by the parabolic reflector 10, is very much larger than the surface area presented to the direct incoming energy.

The importance of microwave absorber may be further appreciated by now referring to FIG. 2. When antenna 10 is used to receive a signal coming from an angle near the ground surface, an appreciable part of the received signal is reflected from the ground and approaches the antenna from an angle different from that of the true source, as shown in FIG. 2. The total received signal appears to come from an angle located between the true angle and the ground reflection angle. Narrowing of the beam and reduction of the side lobes reduces the effect of the reflected signal and permits accurate tracking nearer the ground angle.

In the instant method, the special shaping and positioning of the microwave absorber and the particular tuning of the absorbent material provides a higher reduction of side lobes and hence greatly widens the circle of resolution. Briefly speaking, if, say, a side lobe of the down beam is higher in sensitivity at the skirts of the upper beam, then the error detection function in the antenna servo system will cause the antenna to be driven off target. High side lobes further contribute to the errors caused by ground reflection since the apparent direction of the incident-radio-frequency energy is distorted. To protect against this false mode of ambiguous tracking it is desirable that the side lobes be small.

The microwave absorbent material 20 may be of the McMillan Type T-SW-2 absorber described in U.S. Pat. No. 2,875,435, entitled "Electromagnetic Wave Absorbing Dielectric Walls," issued on Feb. 24, 1959 to Edward B. McMillan. Or the absorber may be of the "Salisbury Screen" type described in "Antenna Engineering," JASIK 32–36, McGraw-Hill, Inc., 1961. Externally tuning the Salisbury Screen microwave absorber to optimum performance at a certain frequency does reduce slightly the broad band performance. But on the other hand it offers the very real possibility of achieving perfect (or near-perfect) match at any two frequencies wished. In this case the absorber must be operated in two modes: (a) at the lower frequency ($\lambda_0$), the resistance foil is placed approximately $0 < d < \lambda/2$ away from the metallic reflector; and (b) at the higher frequency ($\lambda$), the distance is larger than $\lambda_1/2$, for example, $\lambda_1/2 < d < \lambda_1$. Whenever $d = \lambda/2$, total reflection occurs since no currents are induced in the dissipating material. Accordingly, it may be noted that the distance of the microwave absorber 20 from the dipole antenna 16 varies with frequency. The Salisbury Screen, when tuned to 1680 mc. with a coating of high dielectric material of the exact thickness, gives an absorber with near zero reflection at normal incidence and no more than two percent reflection, for all polarizations, up to and including angles of incidence as great as 30°.

The McMillan Type T absorber is manufactured to the specific bandwidth and polarization requirements of the radar. The T-SW-2 is a sandwich construction of aluminum foil, foam rubber and is a close woven fabric bonded together with a synthetic rubber cement. The surface of the cloth is coated with a latex based mixture. The total construction weighs twelve ounces per square foot and is approximately one inch thick. The material of the outer surfaces make this absorber when edge sealed impervious to effects of temperature, moisture, hydraulic fluids, gasoline and similar solvents. Due to the flexibility of the material it can be easily formed around curvatures of small radii. This absorber operates efficiently when exposed to temperatures of from −62° F. to 185° F. and shows no irreversible mechanical effect.

FIGS. 3, 4, 5 and 6 illustrative how use of the microwave absorber in the antenna R-F system provides: (a) no loss of main beam sensitivity; (b) lower height of sensitivity side lobes relative to the main beam; and (c) narrower width (3 db points) of the main beam.

Although the invention has been described by reference to a preferred embodiment, it is not to be regarded as limited to such. It is contemplated that the invention may be embodied in various other physical forms such as will occur to those skilled in the art as being best suited for use and specific applications.

I claim:

1. An antenna scanning system comprising a parabolic reflector for receiving and reflecting R-F energy, a radome positioned at a predetermined distance from said parabolic reflector, a rotable eccentric cup means mounted within said radome and located near the focal point of said parabolic reflector for receiving reflected R-F energy from said parabolic reflector, a dipole antenna responsive to said reflected R-F energy positioned within said eccentric cup means, and a microwave absorbent means mounted within said radome at a predetermined angular relationship with said rotable eccentric cup and with said dipole antenna and spaced a predetermined distance from said dipole antenna to absorb proportionately more of the R-F energy coming from a downward direction than from the upward direction for all positions of said rotatable eccentric cup, said predetermined angular relationship between said dipole antenna and said microwave absorbent means being askew.

2. An antenna scanning system as described in claim 1 wherein said predetermined angular relationship includes all angles other than 90° with said rotatable eccentric cup.

3. An antenna scanning system as described in claim 1 wherein said microwave absorbent means is positioned with respect to said rotable eccentric cup and said dipole antenna to increase the directivity of the antenna system by reducing side lobes.

4. An antenna scanning system as described in claim 1 wherein said predetermined distance of said microwave absorbent means from said dipole antenna varies with frequency.

References Cited

UNITED STATES PATENTS

| 2,419,556 | 4/1947 | Feldman | 343—761 |
| 2,875,435 | 2/1959 | McMillan | 343—18 |
| 3,153,787 | 10/1964 | Williams | 343—761 |

FOREIGN PATENTS

| 696,519 | 8/1940 | Germany. |

OTHER REFERENCES

"Antenna Engineering," JASIK 32–36, McGraw-Hill, Inc., 1961.

ELI LIEBERMAN, Primary Examiner

M. NUSSBAUM, Assistant Examiner

U.S. Cl. X.R.

343—837, 839, 909